3,230,201
POLYMERS CONTAINING SULFONIC ACID GROUPS

René Maurice Hart, Wilrijk-Antwerp, and Arthur Henri De Cat, Mortsel-Antwerp, Belgium, assignors to Gevaert Photo-Producten N.V., Mortsel, Belgium, a Belgian company
No Drawing. Filed May 31, 1961, Ser. No. 113,630
14 Claims. (Cl. 260—77.5)

The present invention relates to the preparation of polymers and copolymers, bearing sulfonic acid groups, to the polymers and copolymers thus prepared, and to their technical applications.

Polymers and copolymers bearing sulfonic acid groups (—$SO_3H$), are of great importance for their numerous applications some of which are described more particularly hereinafter.

The number of polymers and copolymers bearing sulfonic acid groups, however, is very limited on account of the difficulties of synthesis. If, for instance, soluble polystyrene sulfonic acid must be prepared, special measures must be taken for inhibiting cross-linking between the polymer chains. In insoluble polystyrene sulfonic acid, which is mainly considered as ion-exchanger and which is prepared by sulfonation of cross-linked polystyrene, it is practically impossible to regulate arbitrarily the degree of sulfonation. It is further impossible to sulfonate directly copolymers of styrene when these copolymers bear functional groups which can react with the sulfonating agent.

It has now been found that numerous polymers and copolymers bearing sulfonic acid groups can be prepared by a process comprising the steps of reacting polymers and copolymers containing reactive groups with compounds containing sulfonyl fluoride groups such as polymers and copolymers bearing sulfonyl fluoride groups, and of hydrolysing said polymers and copolymers bearing sulfonyl fluoride groups in weakly alkaline medium to polymers and copolymers bearing sulfonic acid groups.

As polymers and copolymers containing reactive groups can be especially mentioned:

(a) Polymers containing maleic anhydride units,
(b) Polymers containing acrylic anhydride, methacrylic anhydride, acrylyl chloride or methacrylyl chloride units,
(c) Polymers containing vinyl alcohol units,
(d) Polymers containing vinyl isocyanate units,
(e) Polymers containing vinyl amine units, and
(f) Polyethylene imine.

The compounds which are to be reacted with the above polymers and copolymers and which contain sulfonyl fluoride groups are for instance:

(a) Fluorosulfonyl arylides (or aryl amino sulfonyl fluorides)
(b) Fluorosulfonyl benzyl alcohols
(c) Fluorosulfonyl benzoyl chlorides.

Thus polymers or copolymers possessing sulfonyl fluoride groups can be prepared by reacting aminoaryl sulfonyl fluorides of the formula

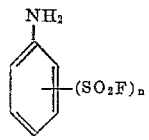

wherein $n$ is at least 1 and the sulfonyl fluoride group or groups may be substituted on the ortho-, meta-, and para-positions in respect of the amino group, with polymers or copolymers bearing reactive groups e.g. anhydride or acid chloride groups, although other synthesis procedures can be applied.

Examples of polymers which can be prepared directly by starting from polymers with reactive groups are the reaction products of aminobenzene sulfonyl fluorides with:

(a) Homopolymers or copolymers of acrlyl anhydride, methacrylyl anhydride, acrylyl chloride or methacrylyl chloride,
(b) Copolymers of maleic anhydride with other monomers, e.g. co(maleic anhydride/styrene), co(maleic anhydride/vinyl acetate), co(maleic anhydride/methyl vinyl ether), co(maleic anhydride/olefines),
(c) Homopolymers or copolymers of vinyl isocyanate, e.g. co(styrene/isopropenyl isocyanate).

The ortho-, meta- and para-aminoaryl sulfonyl fluorides used in the invention for the preparation of polymers and copolymers bearing sulfonyl fluoride groups are synthesised according to known methods, see for instance De Cat, Congress Handbook, XIVth International Congress of Pure and Applied Chemistry, Zurich, Switzerland, July 21-27, 1955, p. 306.

Other polymers and copolymers possessing sulfonyl fluoride groups can be prepared by reacting fluorosulfonyl benxyl alcohols of the formula

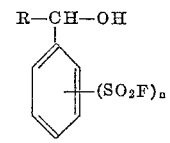

wherein $n$ is at least 1, R is a hydrogen atom or an alkyl group, e.g. methyl and the sulfonyl fluoride group may be substituted on the ortho-, meta- or para-positions, with copolymers of maleic anhydride and other monomers, e.g. co(maleic anhydride/styrene), co(maleic anhydride/ethylene), co(maleic anhydride/vinyl acetate), and the like.

A further class of polymers and copolymers possessing sulfonyl fluoride groups can be prepared by reacting fluorosulfonyl benzoyl chlorides of the formula:

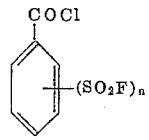

wherein $n$ is at least 1 and the sulfonyl fluoride group or groups may be substituted on the ortho-, meta- or para-positions, with (a) Polyvinyl alcohol or with copolymers containing vinyl alcohol units
(b) Homopolymers or copolymers of vinyl amine
(c) Polyethylene imine.

For hydrolysing these polymers and copolymers bearing sulfonyl fluoride groups to polymers and copolymers bearing sulfonic acid groups, the polymers and copolymers bearing sulfonyl fluoride groups are dissolved in water or, if they are insoluble in water, in a mixture of water and a water-miscible organic solvent e.g., acetone. To this solution is then gradually added an alkali solution, e.g., a sodium hydroxide solution, until all the sulphonyl fluoride groups are hydrolyzed.

In the case of three dimensional copolymers obtained, e.g., by copolymerization of monomers bearing sulfonyl fluoride groups with monomers containing two or more ethylenically unsaturated bonds, the copolymers are suspended in water or, as the case may be, in mixtures of water and organic solvents, e.g., acetone. In the same way as above, an alkali solution is added to the suspension, whereby the copolymer hydrolyses.

The following examples illustrate the invention without limiting the scope thereof.

EXAMPLE 1

A. *Reaction of poly(acrylyl chloride) with m-aminobenzene sulfonyl fluoride*

20 g. of distilled acrylyl chloride, 20 g. of anhydrous dioxane and 100 mg. of azo-bis-isobutyronitrile are mixed in a 250 cm.³ flask provided with an inlet for nitrogen. For 26 h. this monomer solution is irradiated with ultraviolet light whilst slowly bubbling through nitrogen. After the reaction, the non polymerized acrylyl chloride is distilled off under reduced pressure, and the poly-(acrylyl chloride) solution is diluted with 100 cm.³ of anhydrous dioxane. To this solution is gradually added 75 g. of m-aminobenzene sulfonyl fluoride. The reaction is exothermic and a brown precipitate is formed. After adding acetone for obtaining a homogeneous dissolution, the whole is poured out in water whilst stirring, and the pH is set at about 1 by means of hydrochloride acid. The precipitated poly-[N-(m-fluorosulfonyl) - phenyl)-acrylamide] is filtered off, washed with water till neutral and finally dried at room temperature in the presence of sodium hydroxide pellets. Yield: 20.45 g.

*Analysis.*—Calculated: N, 6.12%; S, 13.98%; F, 8.30%. Found: N, 5.23%; S, 12.37%; F, 6.69%.

B. *Hydrolysis to poly[N-(m-sulfophenyl)-acrylamide]*

A solution of 14 g. of potassium hydroxide in 80 cm.³ of water is added with stirring to a solution of 20 g. of poly[N-(m-fluoro sulfonyl phenyl)-acrylamide] in 200 cm.³ of acetone. The acetone is evaporated under reduced pressure. The potassium salt of the hydrolyzed polymer is precipitated in methanol, filtered off, washed with methanol and dried. Yield: 21.7 g.

This potassium salt is then successively treated as an aqueous solution by a polystyrene quantinary amine type anion exchanger and by an excess of polystyrene nuclear sulfonic acid type cation exchanger. After freeze drying of the solution freed from salt, 11.8 g. of poly[N-(m-sulfophenyl)-acrylamide] are obtained having the formula:

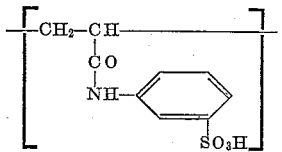

EXAMPLE 2

A. *Reaction of co(ethylene/maleic anhydride) with m-aminobenzene sulfonyl fluoride*

A solution of 6 g. of m-aminobenzene sulfonyl fluoride in 5 cm.³ of acetone is slowly added to a soultion of 5 g. of a co/ethylene/maleic anhydride) polymer in 25 cm.³ of acetone. After heating at 60° C. for 8 hrs., the solution is poured in 1 l. of water containing 40 cm.³ of concentrated hydrochloric acid. The precipitated polymer is again dissolved in 80 ml. of acetone and reprecipitated in 1.5 l. of water containing 20 cm.³ of concentrated hydrochloric acid. The precipitate is filtered off and dried. Yield: 9.42 g. of co[ethylene/N-(m-fluorosulfonyl phenyl)-maleamic acid]. Analysis: 4.1% N.

B. *Hydrolysis to co[ethylene/N-(m-sulfophenyl)-maleamic acid]*

A solution of 5.6 g. of potassium hydroxide in 50 cm.³ of water is added slowly to a solution of 5.0 g. of the above prepared polymer in 50 cm.³ of acetone, while the temperature is maintained at 25° C. After standing 20 hrs. at room temperature, the solution consisting of 2 layers is concentrated and poured in an excess of methanol. The precipitated polymer is filtered off, washed with methanol and dried under vacuum. 6.42 g. of co[ethylene/N-(m-sulfophenyl)-maleamic acid] potassium salt are obtained according to the formula:

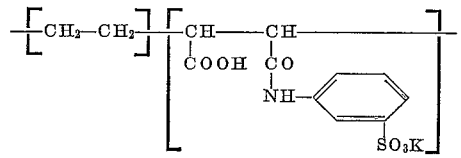

Intrinsic viscosity [η] measured in 0.1 N aqueous sodium chloride: 0.11.

EXAMPLE 3

A. *Reaction of co(styrene/maleic anhydride) with m-aminobenzene sulfonyl fluoride*

A solution of 20 g. of m-aminobenzene sulfonyl fluoride and 20 g. of a co(styrene/maleic anhydride) in 200 cm.³ of acetone is heated at 60° C. for 8 hrs. The polymer is precipitated in ether, washed with ether and dried. Yield: 22.8 g.

*Analysis.*—2.0% N, which corresponds to a 39.0% content of N-(m-fluorosulfonyl phenyl)-maleamic acid.

B. *Hydrolysis to co[styrene/N-(m-sulfophenyl)-maleamic acid]*

An alcoholic solution of 2 g. of sodium hydroxide is slowly added at room temperature to a solution of 5 g. of co[styrene/N-(m-fluorosulfonyl phenyl) - maleamic acid] in 50 cm.³ of butyl acetate. After the addition of ether, the precipitated polymer is filtered off and dissolved in water. The aqueous solution is acidified by addition of N hydrochloric acid. The precipitate is filtered off, washed with N hydrochloric acid, dissolved in acetone and precipitated in ether. After drying in vacuo 4.65 g. of co[styrene/N-(m-sulfophenyl)-maleamic acid] are obtained containing 30% of N-(m-sulfophenyl)-maleamic acid and having the formula:

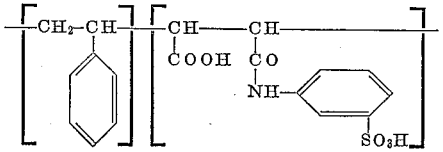

EXAMPLE 4

*Reaction product of co(vinyl acetate/maleic anhydride) and m-aminobenzene sulfonyl fluoride*

In a 500 cm.³ flask fitted with a reflux condenser and a stirrer are brought 20 g. of co(vinyl acetate/maleic anhydride), 200 cm.³ of acetone which has been dehydrated on anhydrous magnesium sulfate, and 25 g. of m-aminobenzene sulfonyl fluoride. The obtained homogeneous solution is heated for 21 h. on an oil-bath of 60° C. The formed co[vinyl acetate/N-(m-fluorosulfonyl phenyl)-maleamic acid] is isolated by pouring the acetone solution into 2 l. of ether and by filtering off the formed precipitate. After washing with ether, the precipitate is dried under vacuum to constant weight.

Yield: 31.0 g. Anaylsis of N: 3.06%.

The above prepared copolymer may be hydrolyzed to co[vinylacetate/N - (m-fluorosulfonyl phenyl)-maleamic acid] containing 57.7% of substituted maleamic acid groups by a procedure similar to that of Example 3, Part B.

EXAMPLE 5

A. *Reaction of co(styrene/maleic anhydride) with p-aminobenzene sulfonyl fluoride*

In a 250 cm.³ flask fitted with a reflux condenser and a stirrer are brought 5 g. of co(styrene/maleic anhydride) having an intrinsic viscosity value [η] of 0.30 dl./g. when measured in acetone at 25° C., and 100 cm.³ of anhydrous acetone.

After adding to the homogenous solution 5 g. of p-aminobenzene sulfonyl fluoride, it is gently refluxed for 2½ h. After reaction the co[styrene/N-(p-fluorosulfonyl phenyl)-maleamic acid] is isolated by pouring the acetone solution into ether, separating the formed precipitate with centrifugation, drying under reduced pressure at room temperature to constant weight.

Yield: 3.5 g. Analysis: N, 0.82%; S, 1.64%.

B. *Hydrolysis to co[styrene/N-(p-sulfonylphenyl)-maleamic acid]*

In a 250 cm.³ flask fitted with a stirrer and a reflux condenser is brought a solution of 2.5 g. of co[sytrene/N-(p-fluorosulfonylphenyl)-maleamic acid] with a nitrogen content of 0.82%, in 100 cm.³ of acetone. By adding to this solution a solution of 1 g. sodium hydroxide in 40 cm.³ of water, the reaction product precipitates. The acetone solution is evaporated and the obtained residue is dissolved in water. After filtering this solution, the copolymer is precipitated in acetone, again dissolved in water and precipitated as an acid by adding 6 N hydrochloric acid. The precipitated co[styrene/N-(p-sulfophenyl)-maleamic acid] is filtered off, washed with water, purified by dissolving in acetone, poured out in water and vacuum-dried at room temperature. 1.3 g. of co[styrene/N-(p-sulfophenyl)-maleamic acid] is obtained according to the formula:

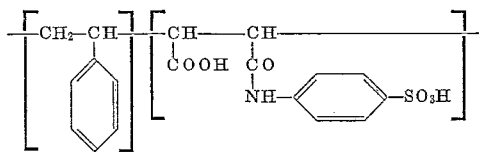

Analysis of N: 0.77%.

EXAMPLE 6

A. *Reaction of co(styrene/maleic anhydride) with 1-(m-fluorosulfonyl phenyl)-ethanol*

In a 250 cm.³ flask fitted with reflux condenser and a stirrer are brought 15 g. of dry co(styrene/maleic anhydride), 15.1 g. of 1-(m-fluorosulfonyl phenyl)-ethanol and 75 cm.³ of dimethylformamide. The obtained homogenous solution is heated for 24 h. on an oil-bath at 60° C. After reaction, the solution is diluted with dimethyl formamide and poured into water which has been acidified to pH 1 by means of hydrochloric acid. The precipitated copolymer is filtered off and washed with water till neutral. After vacuum-drying in the presence of solid sodium hydroxide to constant weight at room temperature, 19.3 g. of co{styrene/mono[1-(m-fluorosulfonyl phenyl)-ethyl]-maleate} are obtained. Analysis of S: 4.75%.

B. *Hydrolysis to co{styrene/mono[1-(m-sulfophenyl)-ethyl]-maleate}*

In a 250 cm.³ flask fitted with a reflux condenser and a stirrer is brought a solution of 10 g. of co{styrene/mono[1-(m-fluorosulfonylphenyl)-ethyl] - maleate} in 100 cm.³ of dioxane. To this homogeneous solution is dropwise added aqueous N sodium hydroxide to pH 10. The reaction mixture is vacuum evaporated to dryness and the residue is dissolved in a mixture consisting of 90 cm.³ of water, 10 cm.³ of acetone and some drops of N sodium hydroxide. After filtering, this solution is poured out into an excess of aqueous 2 N hydrochloric acid. The formed precipitate is filtered off, washed and vacuum-dried, yielding 6.1 g. of co{styrene/mono[1-(m-fluorosulfonyl phenyl)-ethyl]-maleate} according to the formula

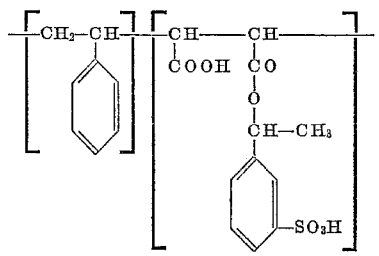

Analysis of S: 1.62%.

EXAMPLE 7

*Co{vinyl acetate/mono[1-(m-sulfophenyl)-ethyl]-maleate}*

In the same way as in Example 6A co{vinyl acetate/mono[1-(m-fluorosulfonyl phenyl)-ethyl]-maleate} can be prepared by reaction of co(vinyl acetate/maleic anhydride) with 1-(m-fluorosulfonyl phenyl)-ethanol.

5 g. of co{vinyl acetate/mono[1-m-fluorosulfonyl phenyl)-ethyl]-maleate} having a content of 4.2% of sulphur are dissolved in a mixture of 50 cm.³ of acetone, 50 cm.³ of dioxane and 60 cm.³ of water. To this solution is dropwise added aqueous 5 N sodium hydroxide as to maintain the pH at 8. The acetone is then distilled off under vacuum and the residual polymer solution is poured into aqueous 2 N hydrochloric acid. The residue is filtered off, repeatedly washed with water and vacuum-dried in the presence of sodium hydroxide to obtain 4.05 g. of co{vinyl acetate/mono[1-(m-sulfophenyl)-ethyl]-maleate} according to the formula

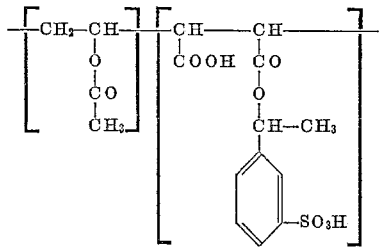

Analysis of S: 2.90%.

EXAMPLE 8

A. *Reaction of co(styrene/isopropenyl isocyanate) with m-aminobenzene sulfonyl fluoride*

In a three-necked 250 cm.³ flask, fitted with a stirrer, a reflux condenser, a dropping funnel and a thermometer, are brought 2 g. of co(styrene/isopropenyl isocyanate) containing 6.7 g. of nitrogen, 4.83 g. of m-aminobenzene sulfonyl fluoride and 10 cm.³ of benezene. The homogeneous solution is heated on an oil-bath of 100° C. for 12 h., and after reaction poured into n-hexane. The reaction product is purified by dissolving twice in methylene chloride and precipitating in n-hexane and freeze-drying from a mixture of benzene and methylene chloride (9/1).

Yield: 1.26 g. of co(styrene/N-m-fluorosulfonyl phenyl-N'-isopropenylurea). Analysis of S: 3.93%.

B. *Hydrolysis to co(styrene/N-m-sulfophenyl-N'-isopropenyl urea)*

In a 100 cm.³ flask fitted with a stirrer and a dropping funnel are brought 2 g. of the above prepared copolymer and 20 cm.³ of acetone. At room temperature are dropwise added 6 cm.³ of aqueous N sodium hydroxide with stirring. After further stirring for 1 h., the formed precipitate is separated by centrifuging. After thorough washing with water, the obtained copolymer is vacuum-dried to obtain 1.6 g. of co(styrene/N-m-sulfophenyl-N'-isopropenyl urea) according to the formula:

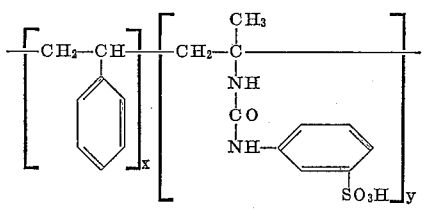

Analysis of S: 3.9%.

EXAMPLE 9

A. Reaction of poly(ethylene imine) with m-fluorosulfonyl benzoyl chloride 8.25 grams of a solution made up from an aqueous solution where 51.2 grams of poly(ethylene imine) is dissolved in 100 grams of solution is diluted with 50 cm.³ of neutral dimenthylformamide. Water and dimethylformamide are then distilled off under vacuum. A new 50 cm.³ of neutral dimethyl formamide are added and distilled off. Finally the anhydrous poly(ethylene imine) is dissolved in 50 cm.³ of neutral anhydrous dimethyl formamide and 50 cm.³ of anhydrous pyridine.

This poly(ethylene imine) solution is dropwise added with stirring to a solution of 22.25 g. of m-fluorosulfonyl benzoyl chloride in 50 cm.³ of dimethylformamide. The reaction is exothermic and the mixture is cooled with a water-bath so as to maintain the temperature in the flask at 30° C. After having added dropwise the poly(ethylene imine) solution the mixture is stirred at room temperature for 5 further hrs. The clear red-coloured solution is poured into methanol and the formed precipitate is dissolved in acetone. The dissolved poly[N-(m-fluorosulfonyl benzoyl)-ethylene imine] is anew precipitated in methanol, sucked off, washed with methanol and vacuum-dried. Yield: 9.7 g. Analysis of S: 11.35%.

B. Hydrolysis to poly[N-(m-sulfobenzoyl) ethylene imine]

In a three-necked 250 cm.³ flask fitted with a reflux condenser, a stirrer and a thermometer, are brought 4.58 g. of the above prepared polymer, 50 cm.³ of dioxane and 5 cm.³ of water. This mixture is heated till reflux temperature and the obtained homogeneous solution is cooled down to 20° C. To this polymer solution are dropwise added 50 cm.³ of aqueous N sodium hydroxide. Stirring is then continued for 2 h. and the temperature is maintained at 20° C. by cooling on a water-bath. After the reaction a part of the water/dioxane mixture is distilled off under reduced pressure and the residue is poured into an excess of a mixture of equal parts of methanol and acetone. The formed precipitate is filtered off, washed with methanol and vacuum-dried. Yield: 4.61 g. of poly[N-(m-sulfobenzoyl)-ethylene imine] according to the formula:

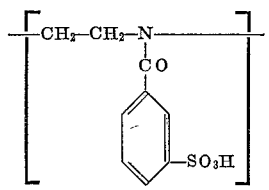

Analysis of S: 10.11%.

EXAMPLE 10

A. Reaction of polyvinylamine with m-fluorosulfonyl benzoyl chloride

A solution in 400 cm.³ of water of 10 g. polyvinyl amine hydrochloride prepared according to R. Hart, J. Polymer Sci. 29, 629 (1958) is allowed to flow through a column filled with 400 cm.³ of the anion exchanger Amberlite IRA–410 (registered trademark). An aqueous solution of polyvinyl amine is collected and evaporated under reduced pressure to a viscous syrup which is mixed with dimethylformamide in a 500 cm.³ flask equipped with a stirrer and a dropping funnel. The residual water is distilled off under vacuum and after adding 50 cm.³ of anhydrous dimethylformamide and 50 cm.³ of anhydrous pyridine, 22.25 g. of m-fluorosulfonyl benzoyl chloride is dropwise added. By cooling, the reaction mixture is maintained at room temperature. After stirring for 1 h. a clear solution is obtained which is diluted with 50 cm.³ of methanol and poured into acetone. The formed precipitate is sucked off, washed with acetone and dried at room temperature under reduced pressure. Yield: 10 g. of poly[N-(m-fluorosulfonylbenzoyl)-vinylamine]. Analysis of S: 1.11%.

B. Hydrolysis to poly[N-(m-sulfobenzoyl) vinylamine]

In a three-necked flash equipped with a stirrer and a thermometer are brought 2 g. of the above prepared polymer, 40 cm.³ of water and 20 cm.³ of methanol. At room temperature, aqueous N sodium hydroxide is dropwise added to reach a pH of 8. After stirring for 2 h., the solution is poured into a mixture of methanol and acetone. The formed precipitate is filtered off and dried at room temperature to yield 2 g. of poly[N-(m-sulfobenzoyl) vinylamine] according to the formula:

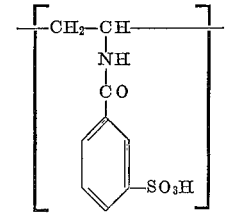

Analysis of S: 0.95%.

EXAMPLE 11

A. Reaction of polyvinyl alcohol with m-fluorosulfonyl benzoyl chloride 22.25 g. of m-fluorosulfonyl benzoyl chloride are added dropwise to a finely divided suspension of 8.8 g. of polyvinyl alcohol (average molecular weight: 23,000) in 200 cm.³ of pyridine which is heated at 80° C. The temperature rises to 97° C. while the polymer gradually dissolves. After heating for 3 h. at reflux temperature, the solution is filtered and poured into water. The formed fibrous precipitate is filtered off, divided, washed several times with water and dried. Yield: 23.3 g. of poly(vinyl-m-fluorosulfonylbenzoate). Analysis of S: 11.3%, which corresponds to 81% of vinyl m-(fluorosulfonyl)-benzoate.

B. Hydrolysis to polyvinyl-m-sulfobenzoate

To a solution of 10 g. of the above prepared poly-(vinyl-m-fluorosulfonyl-benzoate) in 100 cm.³ of acetone are added at room temperature 71.5 cm.³ of aqueous N sodium hydroxide. The acetone is evaporated under vacuum and the resulting aqueous polymer solution is heated for ¾ hr. at 70° C. whilst maintaining the pH at 7. The polymer is isolated by precipitation in acetone, dissolution in methanol/water and a second precipitation in acetone.

Yield: 10 g. of poly(vinyl-m-sulfobenzoate sodium salt) having the formula

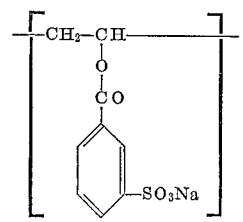

Intrinsic viscosity [$\eta$] measured in 0.1 N aqueous sodium chloride: 0.18 dl./g.

The greatest advantage of the process according to the present invention is the possibility of preparing at will "tailored" polymeric substances bearing sulfonic acid groups. This means that e.g. the solubility properties, the molecular weight of these polymeric substances can be adapted in such a way as to meet in the best way the requirements of each specific application of each industrial field, be it their use in the textile industry, their use in the manufacture of photographic materials, or any other use.

The soluble polymers can for instance be used as synthetic gums, thickening agents, antistatic agents, textile finishing agents and the like. The insoluble polymers and copolymers find their most important application as ion-exchange resins and can also be used in the manufacture of fibres possessing a better dyeability.

The soluble high molecular weight polymeric substances bearing sulfonic acid groups and which have been prepared according to the present invention can also be used as thickening agents for gelatine, among others when preparing photographic emulsions. They possess the advantage of being used in a smaller amount for achieving the same effect than the low molecular polystyrene sulfonic acid employed hitherto for this purpose.

The soluble low molecular weight polymeric substances bearing sulfonic acid groups according to the present invention can also be applied as precipitating agents in the preparation of photographic gelatino-silver halide emulsions (see e.g. Belgian patent specification 561,484, filed October 9, 1957; and British patent specification 939,161, January 29, 1960). Thanks to their low molecular weight these compounds do not cause any additional increase of viscosity of the precipitated emulsion.

Some polymeric substances bearing sulfonic acid groups can be used as plasticizers, e.g. for gelatine containing compositions such as photographic emulsions.

Some of the polymers prepared according to the present invention can also be used as binding agents in photographic silver halide emulsions.

Further, the polymeric sulfonic acids prepared according to the present invention come also into consideration for being added to the baryta paste with the purpose of thinning it and of facilitating its coating onto photographic paper.

We claim:

1. A process for the manufacture of polymeric substances bearing sulfonic acid groups comprising the steps of reacting a polymeric substance containing reactive groups selected from the group consisting of carboxy, hydroxy and amino radicals with a member selected from the group consisting of aryl amino sulfonyl fluoride, fluorosulfonyl benzyl alcohol and fluorosulfonyl benzoyl chloride and hydrolysing the obtained polymeric substance bearing aryl sulfonyl fluoride groups in an alkaline medium to a polymeric substance having sulfonic acid groups.

2. The process of claim 1 wherein the reaction of the polymeric substance with the member selected from the group consisting of an aryl amino sulfonyl fluoride, fluoro sulfonyl benzyl alcohol and fluoro sulfonyl benzyl chloride is carried out in the presence of an inert solvent.

3. Polymeric substances bearing sulfonic acid groups which are prepared according to the process described in claim 1 wherein the sulfonyl fluoride bearing group is linked to the polymer through a member selected from the group consisting of an amide radical and an ester radical.

4. Process for the manufacture of a polymeric substance having sulfonic acid groups according to claim 1, wherein said polymeric substance containing reactive groups is a polymeric substance containing vinyl amine units.

5. Process for the manufacture of a polymeric substance having sulfonic acid groups according to claim 1, wherein said polymeric substance containing reactive groups is polyethylene imine.

6. A process for the manufacture of polymeric substances bearing sulfonic acid groups comprising the steps of reacting a polymer containing acrylic anhydride polymers with a member selected from the group consisting of aryl amino sulfonyl fluorides, fluoro sulfonyl benzyl alcohols and fluoro sulfonyl benzyl chlorides and hydrolyzing the obtained polymeric substances bearing aryl sulfonyl fluoride groups in an alkaline medium to a polymeric substance having sulfonic acid groups.

7. A process for the manufacture of polymeric substances bearing sulfonic acid groups comprising the steps of reacting a polymer containing acrylic chloride polymers with a member selected from the group consisting of aryl amino sulfonyl fluorides, fluoro sulfonyl benzyl alcohols and fluoro sulfonyl benzyl chlorides and hydrolyzing the obtained polymeric substances bearing aryl sulfonyl fluoride groups in an alkaline medium to a polymeric substance having sulfonic acid groups.

8. A process for the manufacture of polymeric substances bearing sulfonic acid groups comprising the steps of reacting a polymer containing maleic anhydride units with a member selected from the group consisting of aryl amino sulfonyl fluorides, fluoro sulfonyl benzyl alcohols and fluoro sulfonyl benzyl chlorides and hydrolyzing the obtained polymeric substances bearing aryl sulfonyl fluoride groups in an alkaline medium to a polymeric substance having sulfonic acid groups.

9. A process for the manufacture of polymeric substances bearing sulfonic acid groups comprising the steps of reacting a polymer containing vinyl alcohol polymers with a member selected from the group consisting of aryl amino sulfonyl fluorides, fluoro sulfonyl benzyl alcohols and fluoro sulfonyl benzyl chlorides and hydrolyzing the obtained polymeric substances bearing aryl sulfonyl fluoride groups in an alkaline medium to a polymeric substance having sulfonic acid groups.

10. A process for the manufacture of polymeric substances bearing sulfonic acid groups comprising the steps of reacting a polymer containing vinyl isocyanate polymers with a member selected from the group consisting of aryl amino sulfonyl fluorides, fluoro sulfonyl benzyl alcohols and fluoro sulfonyl benzyl chlorides and hydrolyzing the obtained polymeric substances bearing aryl sulfonyl fluoride groups in an alkaline medium to a polymeric substance having sulfonic acid groups.

11. A process for the manufacture of polymeric substances bearing sulfonic acid groups comprising the steps of reacting a copolymer consisting of maleic anhydride and ethylene with a member selected from the group consisting of an aryl amino sulfonyl fluoride, fluoro sulfonyl benzyl alcohol and fluoro sulfonyl benzyl chloride and hydrolyzing the obtained polymeric substances bearing aryl sulfonyl fluoride groups in an alkaline medium to a polymeric substance having sulfonic acid groups.

12. A process for the manufacture of polymeric substances bearing sulfonic acid groups comprising the steps of reacting a copolymer consisting of maleic anhydride and styrene with a member selected from the group consisting of an aryl amino sulfonyl fluoride, fluoro sulfonyl benzyl alcohol and fluoro sulfonyl benzyl chloride and hydrolyzing the obtained polymeric substances bearing aryl sulfonyl fluoride groups in an alkaline medium to a polymeric substance having sulfonic acid groups.

13. The process of claim 12 wherein the reaction of the polymeric substance with the fluorosulfonyl benzyl alcohol is carried out in the presence of an inert solvent.

14. Polymeric substances bearing sulfonic acid groups which are prepared according to the process described in claim 12 wherein the sulfonyl fluoride bearing group is linked to the polymer through a member selected from the group consisting of an amide radical and an ester radical.

References Cited by the Examiner

UNITED STATES PATENTS

| | | | |
|---|---|---|---|
| 2,475,886 | 7/1949 | Goebel | 260—79.3 |
| 2,586,363 | 2/1952 | McAlevy | 260—79.3 |
| 2,645,621 | 7/1953 | D'Alelio | 260—2.2 |
| 2,653,973 | 9/1953 | Hedrick | 260—79.3 |
| 3,041,317 | 6/1962 | Gibbs | 260—79.3 |

FOREIGN PATENTS 1,136,110  9/1962  Germany.

OTHER REFERENCES

Boundy-Boyer: "Styrene, Its Polymers, Copolymers and Derivatives" (1952), pp. 129, 156, 157.

LEON J. BERCOVITZ, *Primary Examiner.*

M. STERMAN, H. N. BURNSTEIN, DONALD E. CZAJA, *Examiners.*